March 30, 1943.  O. P. HAEGELE ET AL  2,315,256
PUNCHING AND CUTTING MACHINE
Filed Aug. 20, 1941   7 Sheets-Sheet 2

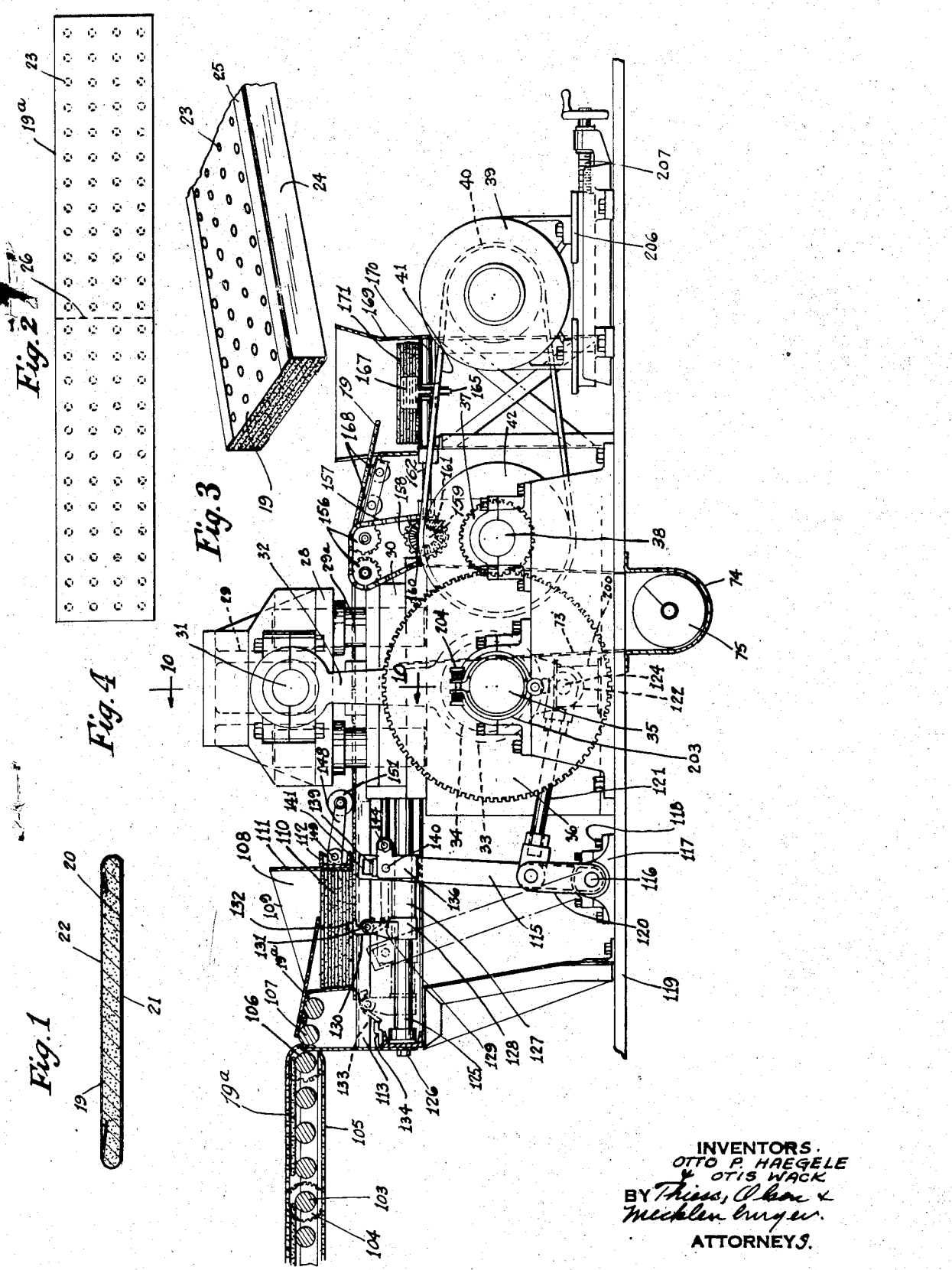

INVENTORS
OTTO P. HAEGELE
& OTIS WACK
BY Thiess, Olsen &
Mecklenburger
ATTORNEYS

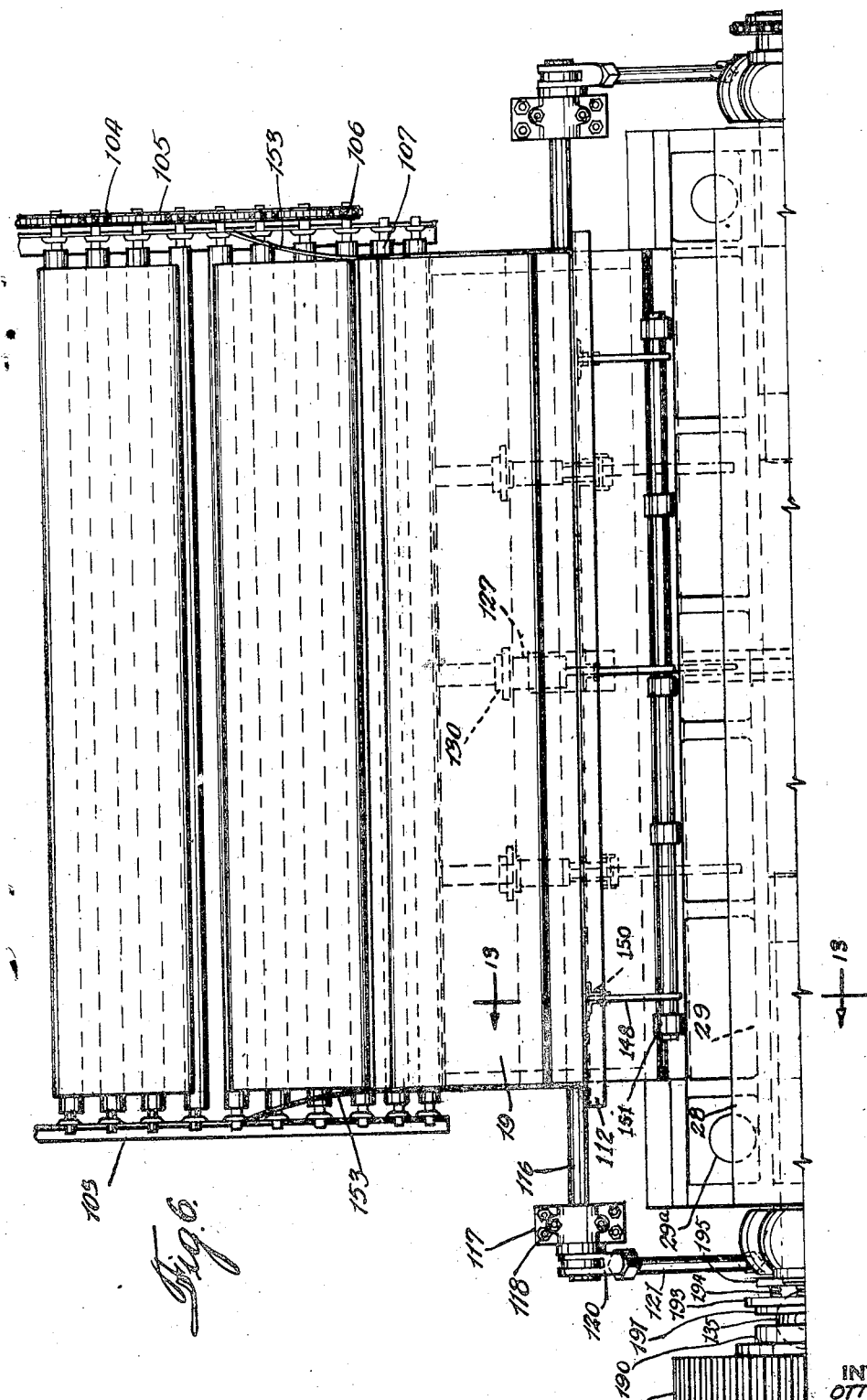

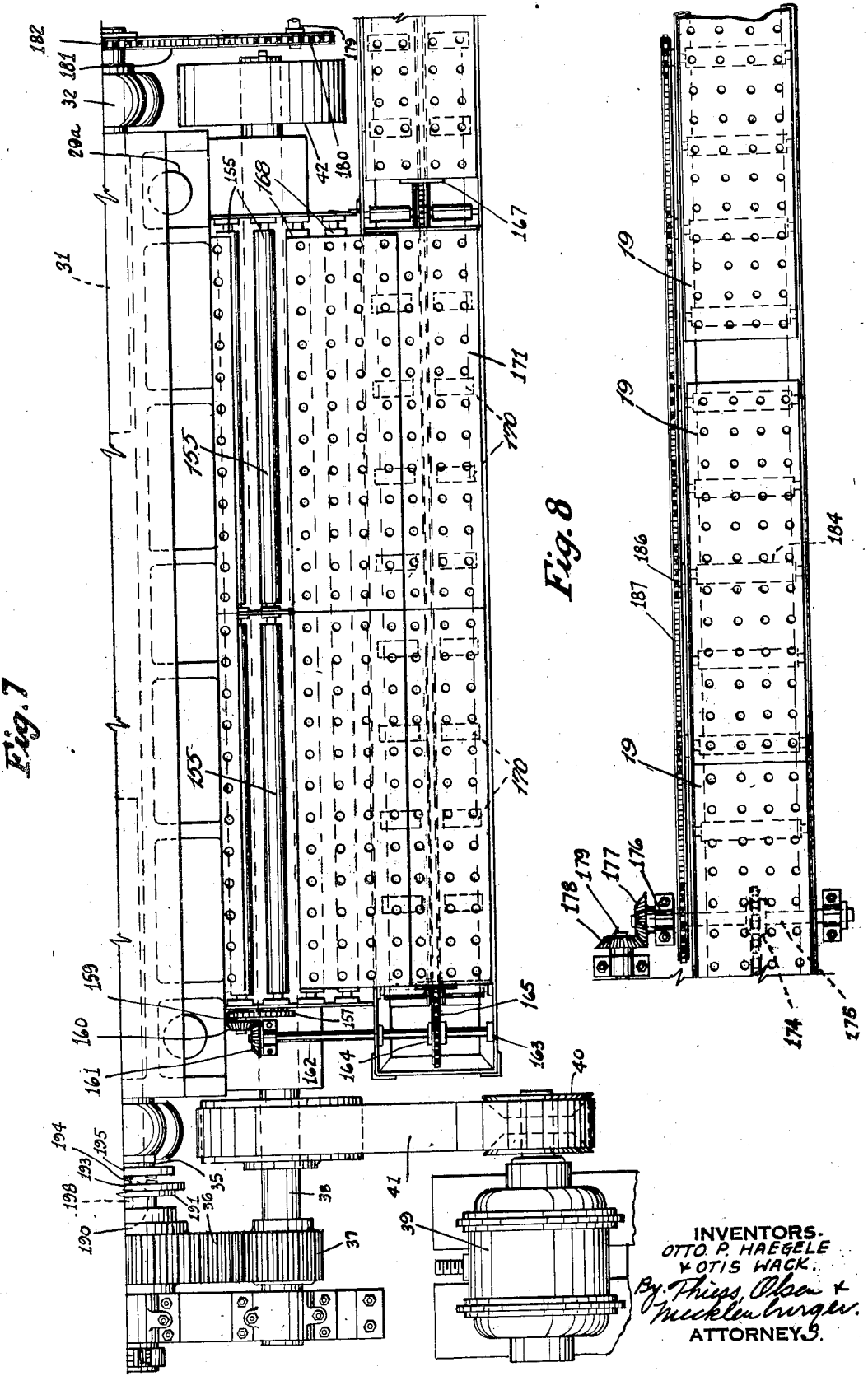

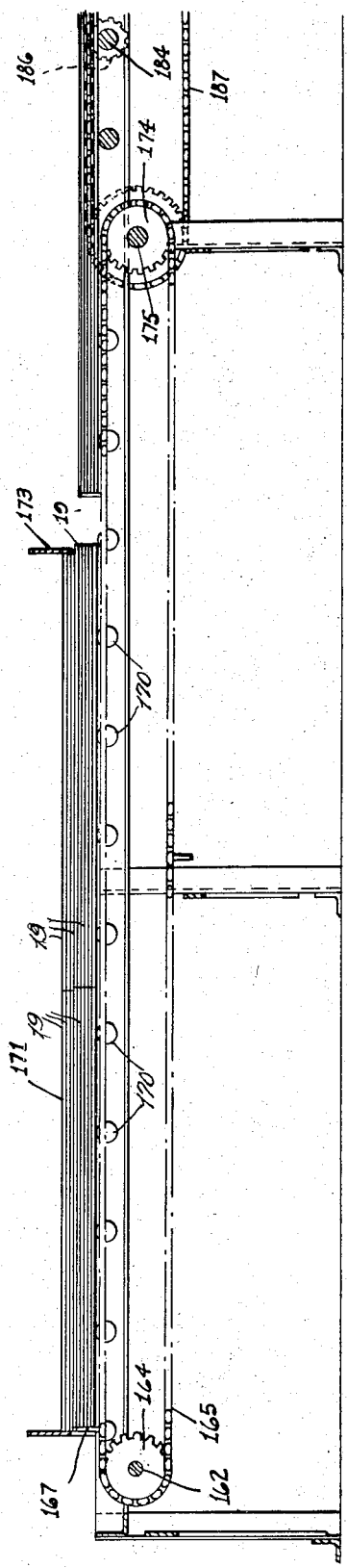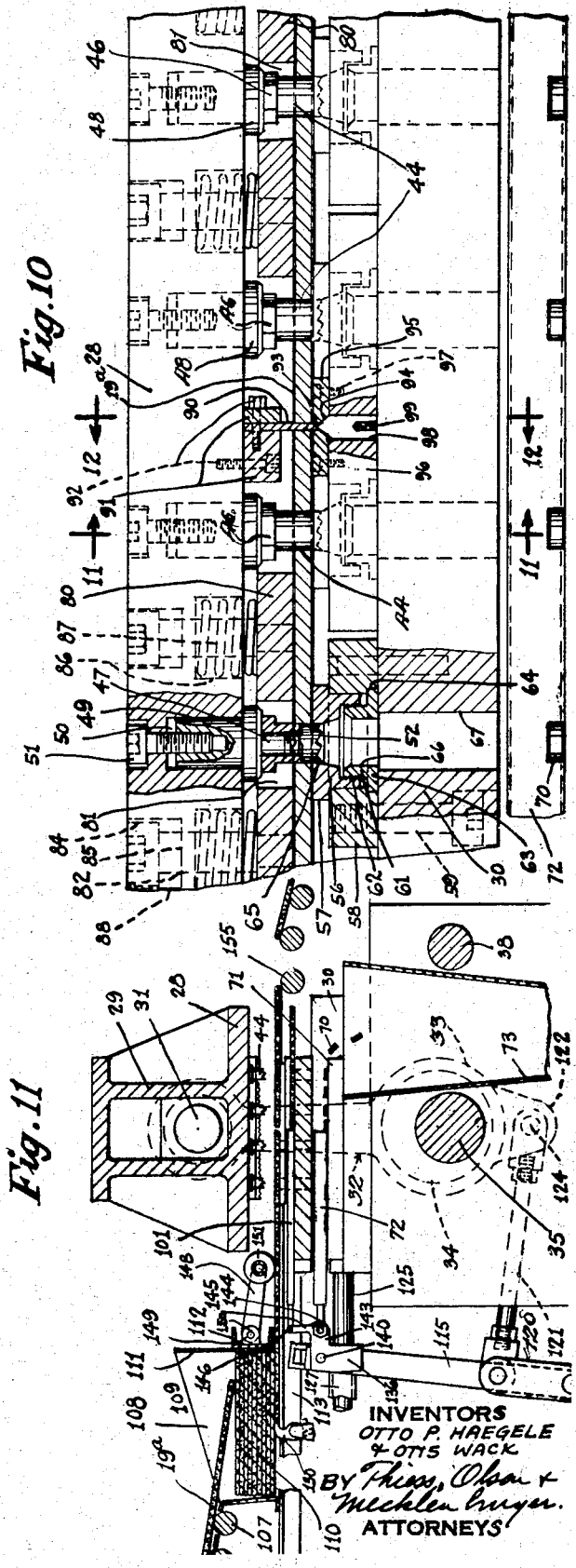

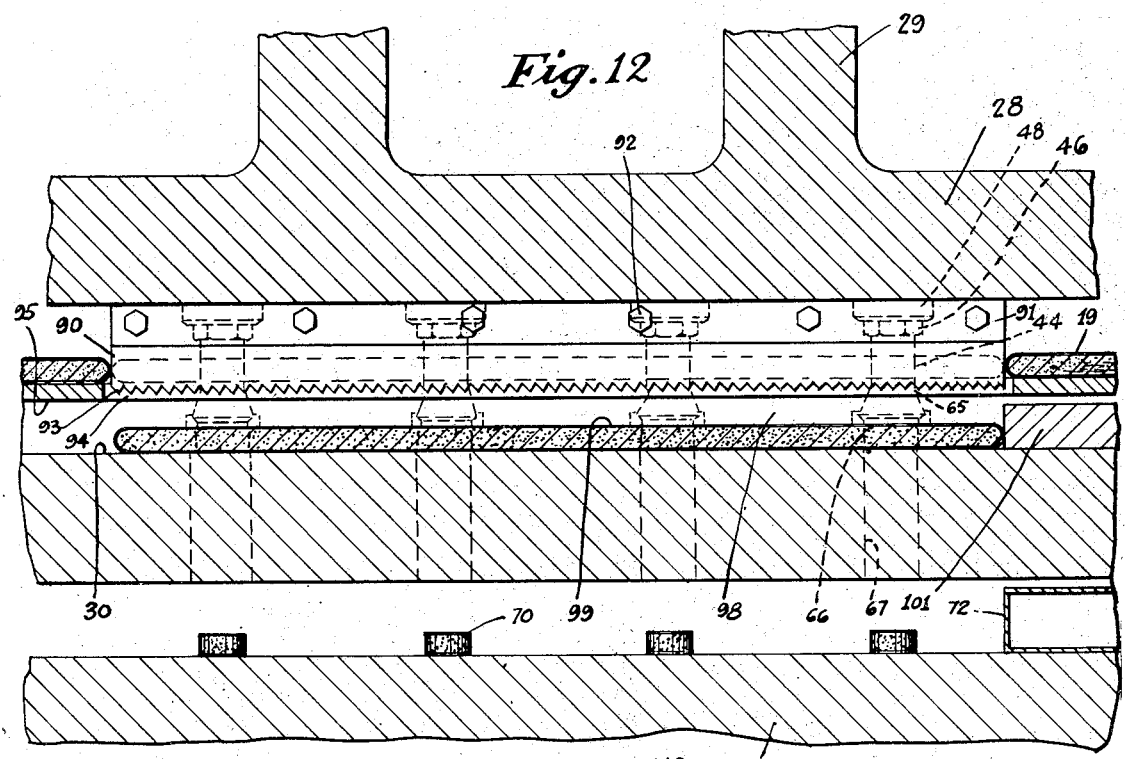
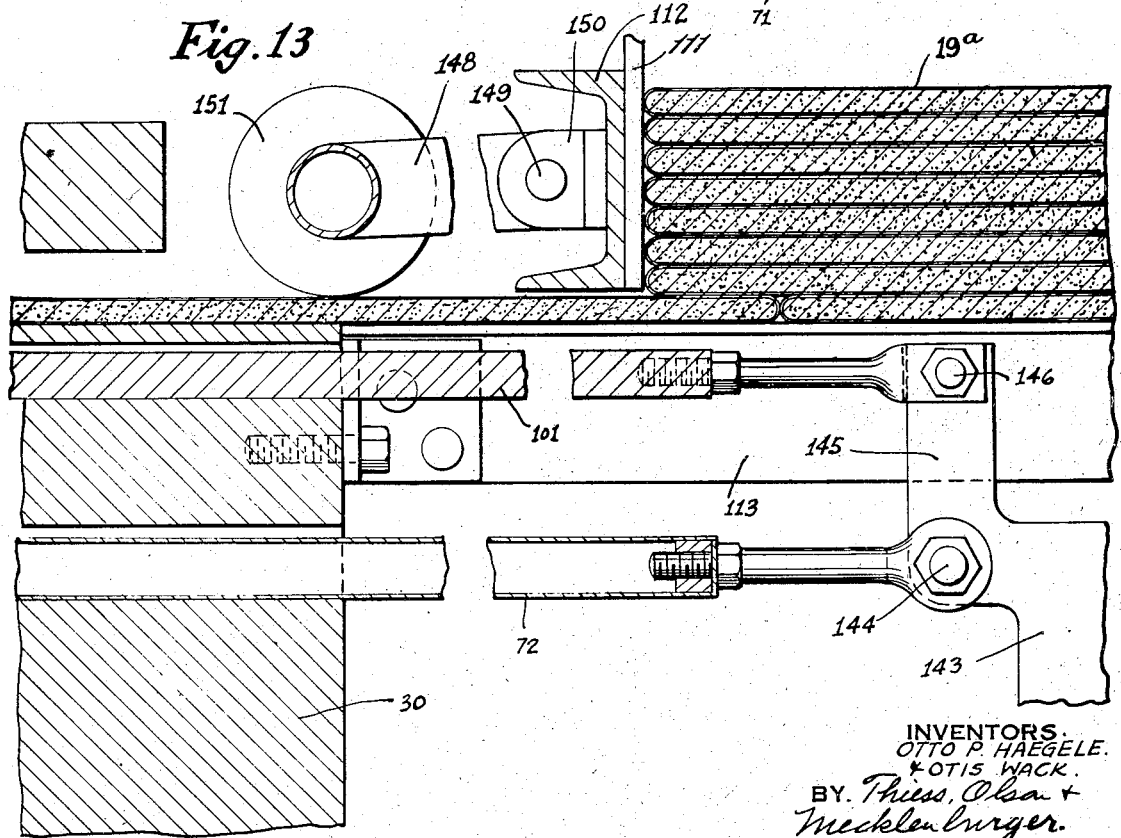

March 30, 1943.    O. P. HAEGELE ET AL    2,315,256
PUNCHING AND CUTTING MACHINE
Filed Aug. 20, 1941    7 Sheets-Sheet 7
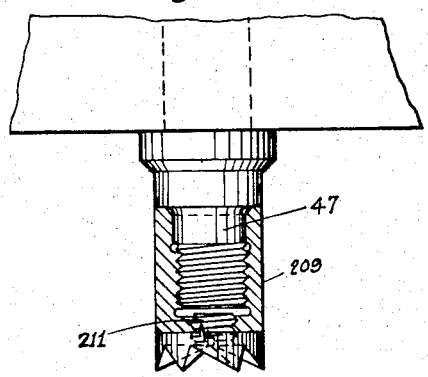
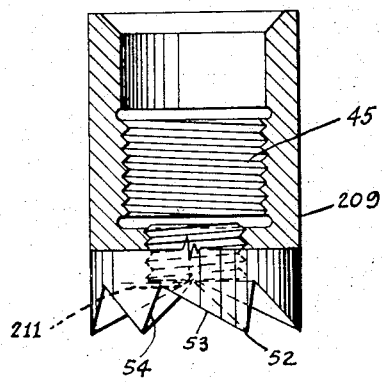
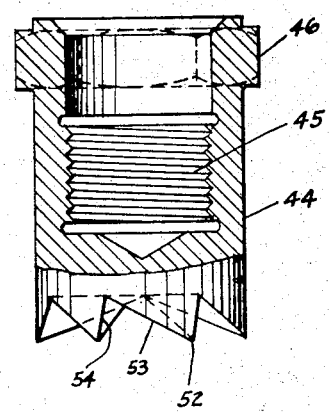
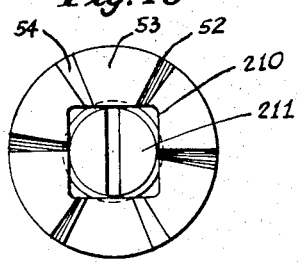
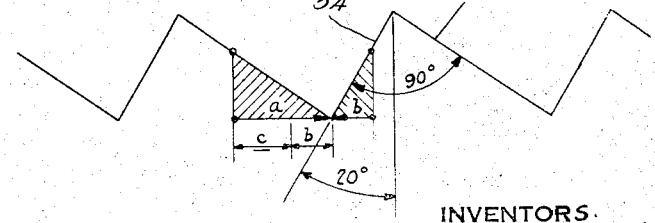
INVENTORS.
OTTO P. HAEGELE
& OTIS WACK
BY
ATTORNEYS.

Patented Mar. 30, 1943

2,315,256

UNITED STATES PATENT OFFICE 2,315,256

PUNCHING AND CUTTING MACHINE

Otto P. Haegele, Chicago, and Otis Wack, Evanston, Ill., assignors to United States Gypsum Company, Chicago, Ill., a corporation of Illinois Application August 20, 1941, Serial No. 407,516

15 Claims. (Cl. 164—15)

This invention relates to machines for and methods of operating on building boards, and more particularly to machines for perforating and cutting building boards, especially of the gypsum plasterboard type.

In the manufacture of certain types of gypsum plasterboards, it is desirable to punch holes through the boards for the purpose of giving a better bond between the board and a layer of plaster which is applied subsequent to the erection of the board. Heretofore the holes have been punched into a moist plasterboard web or stream just before cutting the moist web into the usual four-foot standard or other predetermined lengths. The moist web is usually severed completely into eight-foot lengths, and these lengths are scored or perforated intermediate their ends so that they may readily be broken at the score line into four-foot lengths after passing through a dry kiln. With this procedure, the boards may, and often do, break off at the score line while passing through the drying kiln so that a kiln jam results from the boards' piling up in the kiln, and, as a result, the machine may be shut down for an extended period.

Furthermore, the perforating machine for punching holes in the continuously moving wet gypsum board web must operate at high speed in order to be synchronized with the high speed of the web. These modern machines often move the web at 125 feet or more per minute, and machines for wet-punching at this speed must be carefully designed and constructed to prevent excessive vibration. Also, it is difficult to synchronize the cut-off with the punching operation so that the board will always be cut off midway between two transverse rows of holes or in other predetermined relation thereto.

Gypsum plasterboards are generally shipped out in bundles, usually six boards to a bundle, and it has been proposed to form the holes in the boards by drilling through the six boards in the bundle by means of a multiple spindle drill. Such drills, however, wear out rapidly and tend to deface the boards with gypsum powder, which lowers their salability.

An object of the invention is to provide a machine for and method of punching gypsum boards in a dry state after passing through the drying kiln.

Another object of the invention is to provide a punching machine in which dry multiple-length boards are cut into single lengths simultaneously with a punching operation, thus avoiding the possibility of kiln jams due to scored multiple-length moist boards which often break at the scored line while passing through a dry kiln.

A further object of the invention is to produce dry-punched perforated gypsum boards in which the holes are perfectly formed and truly cylindrical.

A further object of the invention is to produce punched boards which are not defaced by gypsum dust.

A further object of the invention is to dry-punch boards after they are discharged from the web cutting machine so that the punching operation has no retarding influence on the speed of the web or of the board manufacturing machine.

A still further object of the invention is to produce a punching machine which is automatic, simple in construction, and does not require highly skilled labor to operate; also to improve punching machines and methods in other respects hereinafter specified and claimed.

In the drawings:

Fig. 1 is a transverse sectional view through a gypsum plasterboard.

Fig. 2 is a plan view of one of the multiple-length dry plasterboards adapted to be perforated and simultaneously cut into standard lengths by the machine of the present invention, the severing line and the perforations being shown by dotted lines.

Fig. 3 is a perspective view of a bundle of standard length perforated plasterboard.

Fig. 4 is a side elevation of a plasterboard punching and cutting machine with parts in section and illustrates one embodiment of the invention.

Fig. 6 is a plan view of the receiving end of the machine.

Fig. 7 is a plan view of the discharge end of the machine.

Fig. 8 is a plan view of the conveyor for delivering the perforated and cut plasterboards from the punching machine to a bundling machine.

Fig. 9 is an elevation of the board conveyor adapted to receive the finished boards from the conveyor shown in Fig. 8 and assemble these boards into groups for bundling. Six boards are preferably assembled in each group.

Fig. 10 is a sectional elevation through a portion of the punch and die section of the machine and is taken on line 10—10 of Fig. 4.

Fig. 11 is a detail sectional view taken on line 11—11 of Fig. 10.

Fig. 12 is a detail sectional view on line 12—12 of Fig. 10 and illustrates the cut-off knife.

Fig. 13 is an enlarged sectional elevation through the machine taken on line 13—13 of Fig. 6 and illustrates a portion of the feeding mechanism.

Fig. 14 is an elevation partly in axial section of one of the punches and the mounting therefor.

Fig. 15 is an enlarged sectional elevation through the punch shown in Fig. 14.

Fig. 16 is a bottom view of the punch shown in Figs. 14 and 15.

Fig. 17 is a development of the teeth of the punch of Figs. 14 to 16 and 18.

Fig. 18 is a sectional elevation of a slightly modified form of punch.

Figure 5:
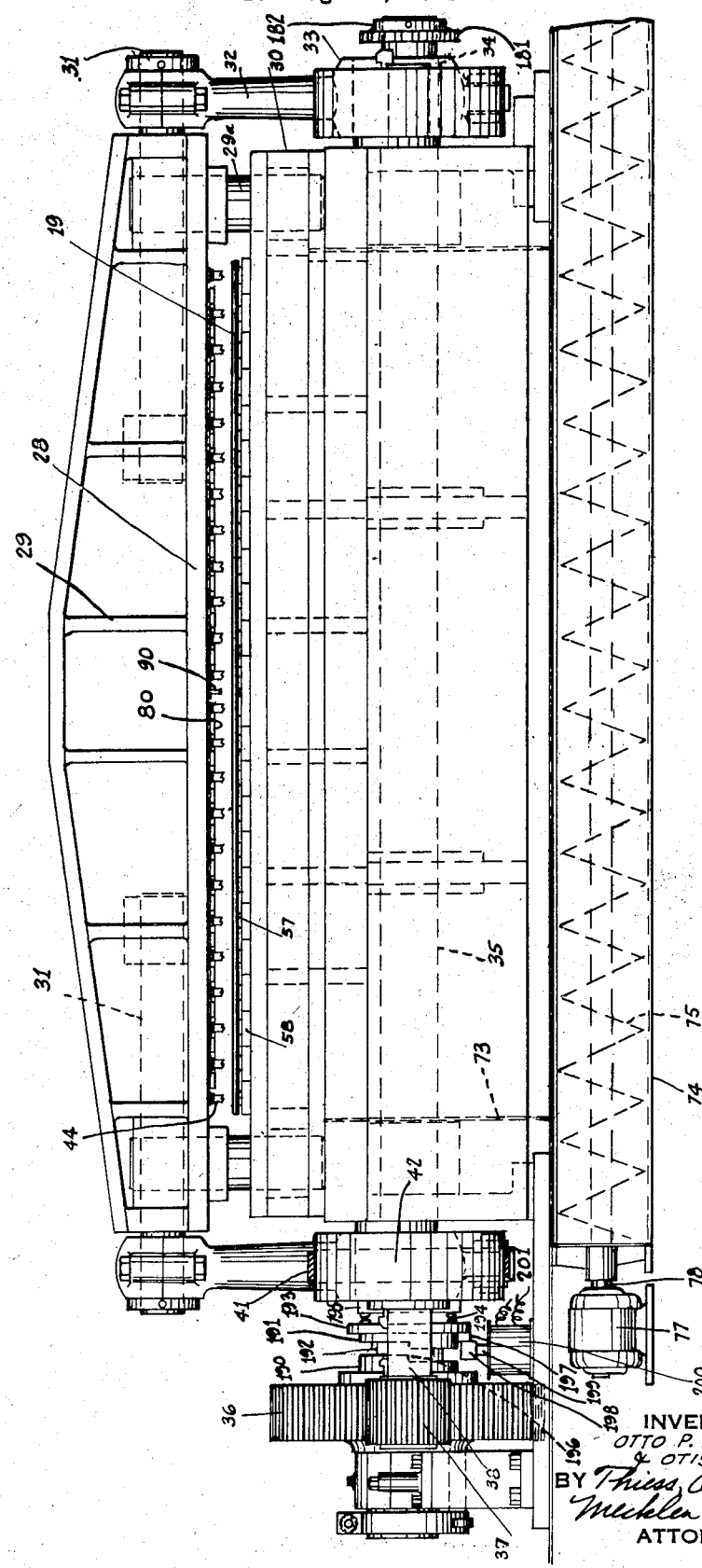
Fig. 5 is an elevation of the discharge end of the machine illustrated in Fig. 4.

Referring to the drawings in detail, Fig. 1 illustrates a plasterboard 19 comprising a core 20 of gypsum composition or the like and a cover sheet 21 folded about the longitudinal edges of the core, and a co-operating cover sheet 22 adhesively secured to the folded edges of the cover sheet 21. Each finished board 19 is provided with a plurality of perforations or holes 23 (Fig. 3) arranged in rows. The holes 23 are preferably of substantial diameter, such, for instance as ¾ of an inch, and serve to provide a better bond for a layer of plaster to be subsequently applied. It is desirable to assemble six boards together in bundle form with paper binding strips 24 along the longitudinal edge of the bundle for retaining the boards together. The edges 25 of the strips are adhesively secured to the faces of the outer boards of the bundle.

Heretofore it has been the practice to punch the holes 23 in a moist, continuously moving web of plasterboard as the web is delivered from a web-forming machine. After punching the holes 23, the web is cut into suitable lengths preferably eight feet long, and these lengths are scored intermediate their ends so that they may manually be broken into standard lengths after they are dried. It sometimes happens that the boards accidentally are broken at the scored line while they are passing through the usual multiple-deck drier or kiln, in which case a kiln jam results and the board machine may have to be shut down for an indeterminate period while the kiln jam is removed. In order to obviate this difficulty and to provide additional advantages, the present invention is adapted to dry-punch the holes 23 and cut the multiple-length gypsum boards into standard lengths after the unscored and unperforated boards have passed through the drying kiln, the multiple-length boards having previously been cut from a web by means of the usual web-cutting machine. Furthermore, the scoring of the boards is obviated so that the multiple-length boards do not break in the kiln and thereby enforce shut-down due to kiln jams. Also, the dry multiple-length boards 19a (Fig. 2) are completely severed at the line 26 simultaneously with the dry-punching of the holes 23. The severing line 26 and perforations 23 are shown in dotted lines in Fig. 2.

The punching and cutting machine illustrated provides many advantages with respect to compactness and accessibility for lubrication and servicing. The machine comprises a frame which is substantially entirely below the plane of the board travel and on which is mounted a reciprocating punch head 28 in the form of an elongated transverse beam having suitable strengthening webs 29. The punch head 28 is slidably mounted for vertical reciprocation on liner pins or guides 29a, two of which are supported on the frame at each side thereof. The lower ends of the pins or guides 29a are fixed in the frame or bed 30. An outstanding pintle 31 extends from each end of the head 28 and a connecting rod 32 connects each pintle with an associated eccentric 34, the eccentrics being secured to a driveshaft 35. A gear 36 (Fig. 1) is secured to the shaft 35 and is driven by means of a pinion 37 secured on a countershaft 38. A motor 39 drives the countershaft 38 through a motor pulley 40, belt 41, and a pulley 42 on the countershaft 38. This arrangement provides continuous reciprocation of the head 28.

A plurality of punches 44, preferably 96 in number, are secured to the head 28 at spaced intervals and are preferably arranged in longitudinal and transverse rows corresponding to the arrangement of perforations shown in Fig. 2. Each of the punches 44 (Figs. 10 and 18) comprises a cylindrical body having internal right-hand threads 45 and an integral nut portion 46 formed at the top of the body portion so that a wrench may be applied and the punch screwed tight onto a stud 47. An annular shoulder 48 on the stud 47 seats against the bottom of the head 28 and a cylindrical portion 49 above the shoulder 48 is fitted tightly within a bore 50 in the bottom of the punch head 28. A machine screw 51 passes through the head 28 and is threaded into the portion 49 to maintain the stud 47 firmly in position.

The operating end of the punch 44 is provided with radial V-shaped grooves to form teeth 52 having sharp angular peripheral edges to cut through the plasterboard without mutilation thereof. The teeth are preferably cut with a 90-degree cutter positioned at an angle relative to the work so that one side of each tooth is at a greater angle than the other relative to an axial plane through the peak of the tooth. That is, as shown in Figs. 15 and 17, the tooth edge 53 and corresponding face of the tooth are preferably about 70 degrees from the vertical and the edge 54 about 20 degrees from the vertical. A slight torque is created by the angular teeth during each punching operation, and this torque tends to tighten the punch on the stud 47 and thus prevent the punch from unscrewing from said stud 47. Each stroke of the machine tends to tighten each punch 44 on its stud 47.

A die 56 is mounted below each punch 44 and is provided with an annular shoulder 57 resting on a die plate 58, the latter being suitably secured to the bed 30 by bolts 59. A bushing 61 is positioned below the die 56 and provided with external threads 62 which engage internal threads in the bottom of the die 56. An annular shoulder 63 is provided on the bottom of the bushing 61 and engages in a recess 64 formed in the bottom of the die plate 58 so that the die 56 is firmly locked to the die plate 58 by means of shoulders 57 and 64. An opening 65 in the die 56 snugly receives the punch 44 and an opening 66 in the bushing 61 is slightly larger than the opening 65 so that slugs may pass therethrough. An opening 67 extends through the bed 30 below the die and is slightly larger than the opening 66. Thus, punch slugs 70 punched from the board 19 by the punches 44 fall downwardly through openings 66 and 67 and are deposited upon a shelf 71 positioned thereunder.

A pusher 72 operated in a manner to be hereinafter described pushes the slugs 70 transversely of the machine into a funnel 73 which directs the slugs 70 into a screw conveyor housing 74 (Fig. 5). A screw conveyor 75 in the housing 74 conducts the slugs from all of the punches to the side of the machine where they may be deposited in a suitable bin, not shown. A motor 77 is connected to shaft 78 of the screw conveyor 75 to cause the continuous rotation of the conveyor.

A stripper plate 80 (Fig. 10) is supported by the head 28 and is provided with a plurality of openings 81 which permit the operation of the punches 44 therethrough. A plurality of studs 82 are secured to the stripper plate 80 and extend upwardly through the punch head 28. The upper end of each stud 82 is provided with an enlarged head 84 in an annular recess 85 formed in the top face of the head 28 to provide a downward stop for the stripper. A recess 86 is formed in the bottom of the head 28 to receive a coil compression spring 87 mounted on the stud 82 and serving to urge the stripper plate 80 downwardly against the plasterboard 19. A clearance 68 is provided for lost motion between the bottom of the stud head 84 and the bottom of recess 80 so that, as the head 28 reciprocates vertically, the stripper plate 80 is lifted away from the board 19 to permit the insertion and removal of the board.

The present embodiment is adapted to consecutively receive and perforate eight-foot dry boards and to simultaneously sever these boards into two four-foot lengths. However, it will be understood that the dry boards may be of any suitable length and may be severed into any suitable number of predetermined lengths.

In order to sever an eight-foot board such as the board 19a into two four-foot lengths during the punching stroke, a cut-off knife 90 (Figs. 10 and 12) is secured to the bottom of the punch head 28 by suitable straps 91 and bolts 92. The lower portion of the knife 90 is provided with a pair of opposed serrated cutting edges 93 which pass through a slot 94 formed in a die plate 95, the latter being secured to the top of a plate 96 by bolts 97. The cutting die plate 95 is provided with an elongated slot 98 to receive the knife in its downward movement so that a narrow strip of material 99 may be cut from the center of the board and be deposited upon a shelf 30. A pusher member 101 then operates simultaneously with the pusher head 72 to push the strip 99 and the plugs 70 into the funnel 73 to be received by the screw conveyor 75 and discharged at the side of the machine.

The dry, double-length boards 19a are delivered from a drying kiln, not shown, to the perforating machine (Fig. 4) by means of a roller conveyor 103, certain rollers of said conveyor being driven by sprockets 104 and chains 105 so as to positively move the boards 19a to the right in close succession. The boards extend transversely of the conveyor, and, as they are discharged therefrom, they tilt downwardly and pass over idler rollers 107 to the hopper 108 of a magazine 109, where the boards accumulate in a pile or stack 110. The front wall 111 of the magazine 108 is reenforced by a channel 112, and this wall terminates slightly above a table 113 (Figs. 11 and 13) by a distance only slightly greater than the thickness of one of the boards 19a so that only one board at a time may be ejected from the magazine.

In order to eject the boards one at a time from the bottom of the magazine 108, a plurality of rocker arms 115 are secured at their lower ends to a transverse shaft 116, the shaft being mounted in bearings 117 secured by bolts 118 to a structural frame member 119. An arm 120 is also secured to the shaft 116 and is connected by means of a link 121 to an extension 122 on the eccentric collar 33. The link 121 is pivoted to the extension at 124.

A plurality of horizontal guide rods 125 are secured at their outer ends to the framework of the machine by bolts 126. A tubular carriage 127 is slidably mounted on each of the guide rods 125 and provided at the rear end thereof with a bracket 128. An upstanding arm 129 is formed on the upper side of the bracket 128 (Fig. 4), and a board-feeding pawl 130 is pivoted on the upper end of the arm 129 at 131. A forwardly extending finger 132 on the pawl is adapted to engage the rear edge of the bottom board in the pile of boards 110 so as to move this bottom board forwardly under the channel iron 112 as the carriage 127 moves forwardly on the guide rod 125. The pawl 130 is provided with a downwardly extending detent arm 133 for engaging a fixed bracket 134 on the framework of the machine, the bracket 134 serving to raise the pawl 130 into position to consecutively engage and eject the boards from the magazine and move them under the punch head.

A bracket 136, including a slide member 139, is pivoted at 140 on the carriage 127 (Figs. 4 and 11). The slide member 139 is engaged in a slot 141 formed in the upper end of the lever 115 so that the carriage 127 reciprocates back and forth on the guide rod 125 in synchronism with the punch head as lever 115 is rocked. A forwardly extending arm 143 is formed on the bracket 136 and the slug push rod 72 is pivoted thereto at 144. The bracket 136 is also provided with an upwardly extending arm 145 to which the pusher 101 is pivoted at 146. Thus the reciprocation of carriage 127 causes the pushers 72 and 101 to be reciprocated to thereby discharge the slugs 70 and strips 99 into the funnel 73.

Arms 148 are pivoted at 149 to brackets 150 on the face of the channel 112. A heavy rollers 151 is mounted on the forward ends of the arms 148 and rests on the upper face of the ejected boards 19a so that the boards are held in edge-abutting relation and each board will be pushed by a succeeding board into perforating position beneath the punches 44. Suitable guides 153 (Fig. 6) bear against the ends of the boards 19a on the roller conveyor 103 to align the boards to enter the magazine 108.

After the punches 44 have punched the holes 23 in a board 19a, the punch head 28 moves to its uppermost position and simultaneously the punched board is moved forwardly from beneath the punch head 28 by the board immediately following. The punched board 19a passes over a pair of driven rollers 155 (Fig. 11), which latter are driven by sprockets 156, chain 157, and sprocket 158 (Fig. 4), the latter sprocket being secured to a continuously running transverse shaft 159. A bevel gear 160 is secured to the end of shaft 159 and meshes with a corresponding bevel gear 161, the latter being secured to a shaft 162 (Figs. 4 and 7) rotatably supported in suitable bearings 163.

A sprocket wheel 164 (Fig. 7) is secured to the shaft 162 and a conveyor chain 165 is driven by the sprocket 164. The conveyor chain 165 extends transversely of the machine and carries a plurality of spaced flights 167, the flights being spaced apart a distance somewhat greater than the length of the two standard-length boards 19, which are simultaneously discharged from the machine after the double-length board 19a has been perforated and cut at the line 26. The flights 167 are of a height approximately the thickness of a bundle preferably containing six boards. As the boards are discharged from the machine, they pass over the driven rollers 155 and tilt downwardly onto a plurality of idler rolls 168 (Figs. 4 and 7), which latter deliver the cut and perforated boards into the hopper 169 and onto the transverse conveyor. The bottom of the hopper 169 is formed by two series of idler conveyor rolls 170 which extend on either side of conveyor chain 165 and serve to support the bundle 171 of punched boards. The end 173 of hopper 169 is spaced above the conveyor rolls 170 slightly more than the height of six boards 19 so that only six boards can pass thereunder thus insuring an accurate count of six boards in each bundle. The conveyor is so synchronized with the punching machine that an accumulation of boards sufficient to form a bundle is always in the hopper 169.

The discharge end of the conveyor chain 165 (Fig. 9) passes around a sprocket wheel 174 mounted upon a rotatable shaft 175, the shaft being suitably supported in bearings 176. A bevel gear 177 (Fig. 8) is secured to one end of the shaft 175 and meshes with the bevel gear 178 secured to the end of the shaft 179. A sprocket wheel 180 (Fig. 7) is secured to the opposite end of shaft 179 and is connected by a chain 181 to a sprocket wheel 182 secured to one end of the driveshaft 35 so that the entire discharge mechanism and the bundling conveyor are driven therefrom. A roller conveyor comprising a series of driven conveyor rolls 184 (Fig. 9) extends beyond the conveyor chain 165 and is driven by suitable sprockets 186 and a chain 187. Thus the bundles of boards are carried to the right (Fig. 8) to a wrapping machine, not shown, where the binding strips 24 are applied as shown in Fig. 3.

In order to stop the vertical reciprocation of the punch head 28 without stopping the motor 39, a clutch 189 is mounted on the shaft 35 and comprises a driving member 190 secured to the sprocket gear 36 and a driven member 191 slidably mounted on the shaft 35 by means of a feather key 192, the gear 36 being rotatably mounted upon the shaft 35. The driven member 191 is provided with a cam portion 193 and compression springs 194 between plate 193 and a pressure plate 195 (Fig. 5) tend to urge the clutch into engagement to cause the continuous rotation of shaft 35. The cam plate 193 is provided with a single cam portion 197, and a roller 198 is moved into the path of this cam when it is desired to stop the reciprocation of the punch head 28. The roller 198 is mounted on a solenoid armature 199 controlled by a solenoid 200.

An electrical circuit 201 leading to the solenoid 200 may be energized from a power circuit by means of a manual switch which the operator closes to cause disengagement of the clutch when he wishes to stop the reciprocation of the punch head 28. When the roller 198 thus is elevated into the path of travel of the cam 197, the driven member 191 is moved to the right against the pressure of springs 194 to disengage the clutch. The cam is so positioned relative to the eccentric 34 that the punch head is stopped in its raised position.

A brake 203 (Fig. 4) constantly engages the shaft 35 so that, when clutch 189 is disengaged, the rotation of shaft 35 is promptly stopped with the punch head 28 in its uppermost position and with the punches 44 free from the plasterboard. Hand screws 204 may be adjusted by the operator to keep a suitable constant brake pressure against the shaft 35. The motor pulley 40 is preferably of a V-shaped variable speed type commonly known as a "Reeves" transmission so that the speed of the punch can be varied by moving the motor. The motor 39 is mounted on a sliding base 206 and may be adjusted by a screw 207.

In the punch embodiment shown in Figs. 14, 15, and 16, a cylindrical punch 209 similar to that previously described is provided with a square or nonrectangular wrench socket 210 in its lower face for the reception of a bent rod wrench of complementary cross section for tightening the punch on the spindle 47 or removing it therefrom. The noncylindrical wrench opening 210 is threaded to receive a plug 211 which serves to prevent portions of the slugs 70 from filling up the wrench socket. The corners of the opening 210 provide bearing surfaces for the wrench so that the threads are not mutilated. The bottom of punch 209 is formed into special teeth such as shown in Fig. 17 and previously described.

In operation, the boards 19 move along the roller conveyor 103 (Fig. 3) and drop onto the magazine 108 to continuously maintain a stack of boards 110 therein. The pusher pawls 130 on the traveling carriages 127 engage the rear edge of the bottom board and move this board forwardly under roller 151 toward a punching position. The movement of the boards is synchronized with the reciprocating punch head, and the boards are simultaneously punched and severed into two lengths by means of the cut-off knife 90. The slugs 70 and cut-off strip 99 are delivered to the screw conveyor and discharged from the side of the machine.

The stripper plate 80 is pressed firmly against the top of the boards 19 under the action of springs 87 while the punch head 28 lifts the punches 44 clear of the board, after which the stripper plate 80 is also elevated to free the board. The board is then moved forwardly by the succeeding board and falls onto the conveyor 170 to form the stack of boards 171. The flights 167 on the conveyor 165 move the stack of boards 171 to the right (Fig. 9) and under the plate 173 and deliver the stack of boards to the roller conveyor 184 (Fig. 8). The latter conveyor moves the stack of boards to a conventional machine for applying the binding strips 24 (Fig. 3).

When the operator wishes to stop the vertical reciprocation of punch head 28, he closes a switch in the solenoid circuit 201 (Fig. 5), causing roller 198 to be elevated into the path of the cam 197, thus opening the clutch 189. The brake 203 causes the prompt stopping of the shaft 35.

It is intended, of course, that the invention should not be limited to the specific embodiment or embodiments disclosed herein, since modifications may be made, and it is contemplated, therefore, by the appended claims to cover any such modifications as fall within the true spirit and scope of this invention.

Having thus described this invention, what is claimed and desired to be secured by Letters Patent is:

1. The method of manufacturing plasterboards comprising drying multiple-length boards and simultaneously perforating and cutting each of said dry multiple-length boards to provide a plurality of standard-length perforated boards from each multiple-length board.

2. The method of manufacturing plasterboards comprising drying multiple-length boards, intermittently moving said boards transversely in longitudinal edge-to-edge relationship, and simultaneously perforating and cutting successive multiple-length boards into a plurality of standard-length perforated boards.

3. The method of manufacturing plasterboards comprising drying multiple-length boards, continually delivering said multiple-length dry boards to a support to continuously maintain a stack of boards thereon, intermittently moving said boards transversely from said stack to form an intermittently moving stream of multiple-length boards in longitudinal edge-to-edge relationship, and simultaneously perforating and cutting consecutive boards in said stream into a plurality of standard-length perforated boards.

4. In an automatic punching machine of the character described, a board perforating and severing means, means for moving multiple-length plasterboards transversely of their length entirely through said punching and severing means so that said multiple-length boards are perforated and severed into standard-length boards, and means for assembling said standard-length boards into groups of a predetermined number and successively moving said groups to a bundling station.

5. In a machine for punching and cutting multiple-length boards of a dry material of brittle character into a plurality of standard-length perforated boards, the combination with means for moving said multiple-length boards transversely of their length in a substantially continuous stream, of means adapted to pierce said dry brittle material so as to form smooth edged cuts for simultaneously punching and cutting successive boards in said stream into a plurality of standard-length perforated boards.

6. In an automatic punching machine of the character described, a board perforating and severing means, means for moving multiple-length plasterboards transversely of their length entirely through said punching and severing means so that said multiple-length boards are perforated and severed into standard-length boards, means for assembling said standard-length boards into groups of a predetermined number and successively moving said groups to a bundling station, means for stacking said standard-length boards in their original multiple-length relationship, and means for segregating groups of a predetermined number of said standard-length boards from said stack.

7. In a machine for perforating and cutting dry, multiple-length plasterboards, a vertically reciprocating head, a plurality of punches on said head for perforating said boards, at least one transverse cutting knife associated with the bottom face of said head for severing said boards into standard lengths, a magazine hopper, means for continuously feeding said multiple-length boards into said hopper to maintain a stack of boards therein, means for continual transferring the bottom board of said stack to a position below said head so as to be punched and severed simultaneously into a plurality of standard-length perforated boards, and means for delivering said punched boards to a discharge point.

8. In a machine for punching holes in dry multiple-length gypsum building boards, a punching head having a plurality of punches, means for vertically reciprocating said head, a magazine hopper, means for continually feeding boards into said hopper to form a stack of boards, means for successively transferring boards from the bottom of the stack to a position below said head so as to be punched and simultaneously severed into a plurality of standard-length perforated boards, means for forming said standard-length perforated boards into groups, and means for moving said groups of punched boards to a discharge point.

9. In a machine for punching holes in building boards, a punching head having a plurality of punches, means for vertically reciprocating said head, a magazine hopper, means for feeding boards into said hopper to form a stack of boards, means for transferring the bottom board of the stack to a position below said head so as to be punched by said punches, a receiving conveyor, means on said conveyor for forming a predetermined number of boards into groups, and means for moving said groups of boards to a discharge point.

10. In a machine for punching holes in gypsum building boards, a punching head having a plurality of punches, means for vertically reciprocating said head, a magazine hopper, means for feeding boards into said hopper to form a stack of boards, a rock arm in operative relation to said head, a pivoted finger associated with said rock arm and adapted to transfer the bottom board of a stack to a position below said head so as to be punched by said punches, and means for delivering said punched boards to a discharge point.

11. In a machine for punching and cutting multiple-length gypsum building boards, a punching head having a plurality of punches and a cutting knife, means for vertically reciprocating said head, a magazine hopper, means for feeding boards into said hopper to form a stack of boards, means for transferring successive boards from the bottom of said stack to a position below said head so as to be punched and cut into standard lengths of punched boards and to form punching and cutting scrap, conveying means, means controlled by said transferring means to move said scrap to said conveying means, and means for delivering said punched and cut standard-length boards to a discharge point.

12. In a machine for punching holes in gypsum building boards, a punching head, a plurality of threaded spindles on said punching head, a punch screwed onto each spindle, teeth on the bottom of said punch, the opposite sides of said teeth having unequal angles with respect to an axial plane of said punch so as to tend to tighten the threads between said spindle and punch at each stroke of said punch, means for vertically reciprocating said head to punch said boards, and means for delivering said punched boards to a discharge point.

13. In a machine for punching holes in gypsum building boards, the combination with a spindle having screw threads, of a punch having threads screwed into the threads of said spindle, and teeth formed on the bottom of said punch, said teeth having unequal angles so as to cause the threads of said spindle and punch to tighten with the punching movement of said punch through said board.

14. In a plasterboard perforating machine, a punching head, a plurality of punches threadedly mounted on said head, the working face of each punch having substantially radial V-shaped grooves arranged to provide teeth having sharp angular peripheral shearing edges, the opposite sides of at least some of said teeth being of unequal angles with respect to an axial plane through the peak of the tooth so that the punch tends to rotate with each punching operation and tighten the threaded connection to said head.

15. In a plasterboard perforating machine, a punching head, a plurality of punches on said head, the working face of each punch having substantially radial V-shaped grooves arranged to provide teeth having sharp angular peripheral shearing edges, the opposite sides of at least some of said teeth being of unequal angles with respect to an axial plane through the peak of the tooth so that the punch tends to rotate with each punching operation, said punch having a non-rectangular axial hole in the face thereof to receive a complementary bent rod wrench, said hole being threaded so as to provide nonthreaded corners for engagement by said wrench, and a plug screwed into said hole.

OTTO P. HAEGELE.
OTIS WACK.